G. C. FISHER.
DRAFT, CHECK, MONEY ORDER, AND OTHER NEGOTIABLE INSTRUMENT.
APPLICATION FILED JUNE 5, 1913.

1,219,634.

Patented Mar. 20, 1917.

G. C. FISHER.
DRAFT, CHECK, MONEY ORDER, AND OTHER NEGOTIABLE INSTRUMENT.
APPLICATION FILED JUNE 5, 1913.

1,219,634.

Patented Mar. 20, 1917.
2 SHEETS—SHEET 2.

Witnesses:

Inventor
George Carl Fisher
by Brown & Malthrop Attys

UNITED STATES PATENT OFFICE.

GEORGE CARL FISHER, OF CHICAGO, ILLINOIS.

DRAFT, CHECK, MONEY-ORDER, AND OTHER NEGOTIABLE INSTRUMENT.

1,219,634.  Specification of Letters Patent.  Patented Mar. 20, 1917.

Application filed June 5, 1913. Serial No. 771,807.

*To all whom it may concern:*

Be it known that I, GEORGE CARL FISHER, a citizen of the United States, and a resident of Chicago, in the county of Cook and State of Illinois, have invented certain new and useful Improvements in Drafts, Checks, Money-Orders, and other Negotiable Instruments; and I do hereby declare that the following is a full, clear, and exact description thereof, reference being had to the accompanying drawings, and to the letters of reference marked thereon, which form a part of this specification.

This invention relates to improvements in drafts, checks, money orders and other negotiable instruments, and consists of the matters hereinafter described and more particularly pointed out in the appended claims.

In the drawings:

Figures 1, 2, 3 and 4 represent face view of instruments of successive series, each embodying the features of my invention.

Figure 4:
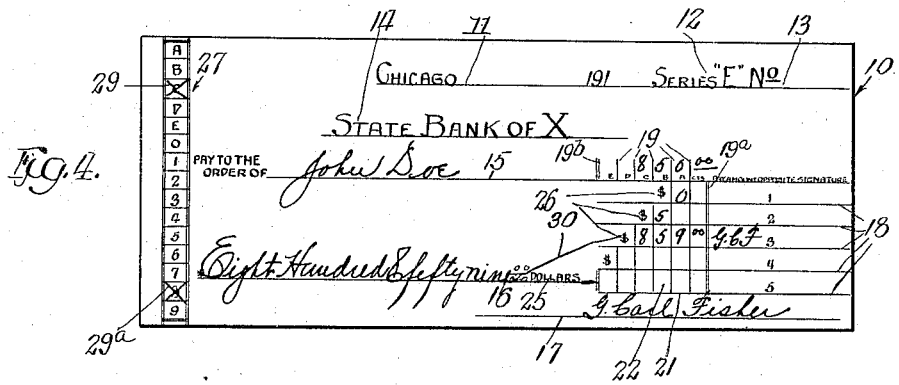

Referring now to that embodiment of my invention shown in the drawings, 10 indicates the instrument, in this case a bank check, which is shown in Figs. 1, 2, 3 and 4, as checks of different series, preferably indicated, as illustrated in the drawings, by the letters B, C, D and E, or like ordinal characters. Checks of the several series are graded according to the decimal system, the check shown in Fig. 1, a check of the B series, being intended for checks written for anything less than $100.00; that in Fig. 2, a check of the C series, for amounts less than $1000.00; that in Fig. 3, a check of the D series, for amounts less than $10,000.00, and that in Fig. 4, a check of the E series, for amounts less than $100,000.00.

In the use of my improved instrument, it is the intention that in the case of bank checks, the depositor shall receive from the bank that one of the series of check forms upon which may be written only the amounts that he is most apt to write. For example, one whose checks usually run below $100., will receive one series, in this case the B series; one whose checks will run larger than this, but usually below $1,000., will receive another series, in this case the C series; and so on, the series denomination, itself, in this case, becoming an indication to prevent the raising of the check by others. In the case of one whose checks vary largely in amount, two or more of the series of checks may be used, but in any case, he will preferably use that series in writing his check which is intended to be limited to the amounts denoted by the said series, although he may use a series intended for larger amounts, as will appear later.

The check 10 is provided with the usual space or ruling 11 for the place and date of the check. To the right of this, and preferably on the same line, is provided at 12 the letter or number indicating the series of the issue, which, in Fig. 1 is printed "Series B"; and Figs. 2, 3 and 4, is printed "Series C", "D" and "E" respectively; after this, and usually on the same line appears the space 13 for the individual number of the check. Below the date line there is provided a space 14 for the printed or written name of the bank or other institution upon which the check is drawn. Below this is the line or space 15 for the inscription of the name of the party to whom the check is made payable—there being printed at the beginning of the line, the words "Pay to the order of", in the usual manner. Below the line or space 15 is the usual line 16 for the inscription in words of the amount of the check, with the word "Dollars" printed at the end of the line, and below that again, the line 17 for the signature of the maker of the check.

There are ruled at the right hand end of the check in the space between the line 15 (where the payee's name is written), and the line 16 (where the amount of the check is written) a plurality of spaces, arranged in vertical and horizontal rows or columns, the number of such spaces, both horizontally and vertically, depending upon the particular series of which the check is a part. 18 indicates the horizontal lines, and 19, the vertical lines defining said spaces. The last vertical line to the right, namely, the line 19$^a$, as also the first vertical line 19$^b$ at the left, are preferably double ruled, in order to more particularly define them, or they may be indicated by lines of color, such as red or the like. The said vertical lines 19$^a$ and 19$^b$ define the limits within which the amount of the check in figures is to be written. Between the line 19$^a$ and the next line 19 on the left, is the space in which the number of cents involved in the amount of the check is to be written in all cases. The head of this vertical column of spaces is thus accordingly inscribed with the abbreviation "Cts." The vertical columns next to the column for "cents" are intended for the integrant numbers of the amount of the check, that is to say, the units, tens, hundreds, thousands, and so on, there being a sufficient number of said vertical columns to write the largest amount that the check of any series is designed to have inscribed upon it. The first column 21 next adjacent to the "Cts." column is headed with the letter "A" or other ordinal character, denoting the beginning or first one of the series of characters denominating the series of the checks. The next adjacent vertical column 22 on the left of the column 21 is headed with the letter B, or the second of the series of said ordinal characters, and so on. There are as many vertical columns defined by the lines 19 to the left of the "Cts." column and as many horizontal lines 18 below the line 15 as there are integrant places in the largest number that the check is designed to bear.

The line 16, at the end of which is printed the word "Dollars" indicated at 25 is on the same level with the bottom horizontal line 18, defining the horizontal spaces and the printed word "Dollars" terminates at the double ruled line 19$^b$, defining the left hand side of the space in which the numerical amount of the check is to be written. The dollar sign 26 is printed in the vertical column next adjacent on the right to the double line 19$^b$ and in the horizontal column next above the bottom column, and in the case of checks of a higher series, as shown in Fig. 2, said dollar sign is printed in the second vertical space, counting from the left, and in the third horizontal space counting from the bottom, and so on with checks of higher series.

At the left end of the check, there is provided a vertical column of spaces 27, in which there are printed, preferably at the top, the ordinals denoting the series (in the case illustrated, the letters of the alphabet), beginning with the first and terminating with the letter denoting the particular series of the check. For example, in the case of the check shown in Fig. 1, there appear the letters A and B, B, indicating the particular series of this check. In Fig. 2 there appear in vertical succession the letters A, B and C, the letter C indicating the series of the check; and in Fig. 3 there appear in vertical succession, the letters A, B, C and D,—the letter D indicating the series of the check. Below these letters in each case, there appear a series of numbers in vertical succession, 0 to 9.

At the left hand end of the line on which the amount of the check is to be written, there is printed a star, or other like device, 28, which is to be crossed or included in the first letter of the written amount indicating the amount of the check. This star is preferably placed close alongside of the column 27 in order to prevent the possibility of the alteration of the written amount by the addition of anything to the left.

The check shown in Fig. 1 is for an amount of anything less than $100. As shown, this check is written for the amount of $55.65. The amount 55 is written with the the letter F crossing the star 28 at the left hand end of the line 16, the rest of the amount being written in the usual manner.

In Fig. 2, the check is for an amount less than $1000.00, and is shown drawn for $504.65. The 504.65 is written on the line 15 after the payee's name in the usual manner, and in addition is written, as above described, on the bottom one of the horizontal lines 18 with the integers of the number in the proper vertical spaces. It is also written so as to read diagonally upward toward the right.

The check in Fig. 3 is written for $9,008.00. In Fig. 4 the check written is for an amount lower than the highest series denoted by the letter E on the check, that is to say, it is written for $859.00.

It is apparent from the several forms of checks shown in Figs. 1 to 4, inclusive, that the check may be used and written as in the case of any ordinary check, the name of the payee being written on the line 15, the numeral amount in figures in the proper columns headed by the indicia B, A and Cts., and the amount of the check spelled out on the line 16. Then, in order to make use of the invention, and prevent the raising of the check, the maker of the check may, at his option, write the check numerically on the lower line 18, putting the figures representing the amount in their proper integrant columns. In addition, he may write the figures indicating the units, tens, thousands and so on in their proper vertical rows or columns and in the horizontal rows or columns in orderly succession so that the amount of the check may be read diagonally upward in a straight line, as clearly shown in the drawings.

A space 28$^a$ is left to the right of the vertical columns provided by the lines 19,— the horizontal lines 18 being prolonged through this space. At the head of this space, are preferably placed the words: "Pay amount opposite signature." The lines 18 are numbered 1, 2, etc., in order, there being as many of such lines and numbers as there are horizontal spaces below the line 15, on which the payee's name is written. Either by means of a stamp, which may be used by a clerk, or by means of the written initials or the signature of the maker of the check, himself, a sign or signature is placed on that horizontal line 18, on which the full amount of the check appears horizontally. Thus, in Fig. 1, the signature or initials appear on the line indicated by the numeral 2 of the lines 18, opposite the amount $55.65.

As manifestly any one of the series of checks may be used to write smaller amounts than that for which the series is intended, a line 30 may be drawn by the maker of the check from the end of the written amount of the check to the $ sign on the horizontal space in which the amount of the check appears in figures as shown in Fig. 4. An additional safety device is provided in column 27 in the following way: The letters appearing in said column terminate with the particular letter or other ordinal character indicating the series of the check. Then, the maker of the check may indicate on it by a cross or other mark 29 that the check is of the denomination of the highest series, or if not, of a lower denomination. For example, in the case of the check written in Fig. 4, while the series of the check is E, that is to say, it is a check upon which may be written anything under $100,000., the check is only drawn for $859., which would be a check of the series C. Therefore, the cross 29 is applied to the letter C.

In addition, and as a safety device to protect the highest number of the highest ordinal place in the check, a cross $29^a$ may be placed on the corresponding number in the column 27. For example, in the case of the check shown in Figs. 1 and 2, the cross mark is placed on the number 5, the amounts written on said checks being respectively $55.65 and $504.65; in the check in Fig. 3, the cross mark is placed on the number 9, the amount of the check being $9,008.00; in the check shown in Fig. 4, the cross mark $29^a$ is placed on the numeral 8, the check being for $850.00.

Figure 5:
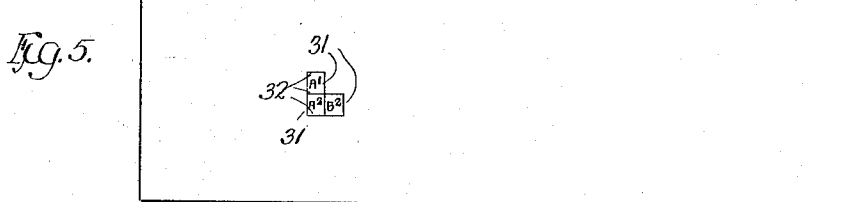
Fig. 5 represents a back view of the check shown in Fig. 1.
Figure 6:
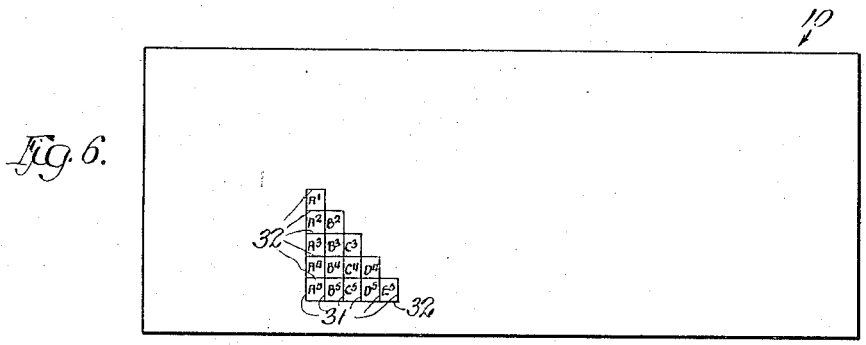
Fig. 6 is a back view of the instrument shown in Fig. 4.

Even with the check thus protected, it might be possible to cut out the numerals appearing in the columns defined by the vertical lines 19 and reverse the same, thus altering the amount of the check. In order to prevent this, I rule on the back of the check, by means of vertical lines 31 and horizontal lines 32, a plurality of horizontal and vertical rows or columns corresponding to those defined by the lines 19 and 18 on the face of the check, and in said columns print in succession, the letters $A^1$ $A^2$ and so on in the vertical column back of the column headed by the letter A on the face of the check, with the superscript corresponding in number to the horizontal lines 1, 2 and so on on the face of the check; the letters B in the next vertical column with similar superscripts to the right; the letters C in the next succeeding columns with like superscripts and so on, as clearly shown in Fig. 6 in which is shown the back of the check illustrated in Fig. 4 and as shown in Fig. 5, showing the back of the check illustrated in Fig. 1.

Apparently, if it be attempted to interchange the 9 and the 5 so as to make the check in Fig. 4 read $895. instead of $859., when said check is reversed and looked at from the rear, it will appear that the corresponding spaces at the back of the check have been reversed, and when read from left to right will read $B^3$ $A^3$ instead of $A^3$ $B^3$ as they should be. Thus, it would be impossible to cut out and change the numbers as described without detection.

While in the following claims I used the term check throughout as denominating the type of instrument, it is to be understood that my invention is in no way limited thereby, the term check being used generically and the claims being intended to cover any instrument to which the invention is applicable.

I claim as my invention:—

1. A check form designed to be drawn for not more than a maximum amount, and upon which is provided an ordinal character indicating the number of integrant places in said maximum amount that is to be written upon said check, said check having a part that is ruled by intersecting horizontal and vertical lines to provide a plurality of spaces arranged in horizontal and vertical rows, one of said vertical rows being a "cents" row or column, and in addition thereto there are as many horizontal and as many vertical rows of spaces as there are integrant places in said maximum amount, denominated by the said ordinal character, said check having another part ruled to provide a series of spaces in which are provided a series of the ordinal characters, the highest ordinal character denominating the series of the check.

2. A check form designed to be drawn for not more than a maximum amount and upon which is provided an ordinal character indicating the number of integrant places in said maximum amount that is to be written upon the check, said check form having a part on its front face that is ruled by intersecting horizontal and vertical lines to provide a plurality of spaces arranged in horizontal and vertical rows, one of said vertical rows of spaces being a "cents" row or column, and in addition thereto there are as many horizontal and as many vertical rows of spaces as there are integrant places in said maximum amount denominated by said ordinal character, said check having another part ruled to provide spaces in which are provided a series of ordinal characters, the highest of which denominates the series of the check, each vertical row to the left of the "cents" row or column being headed by ordinal characters in series, and each horizontal row being indicated by other ordinal characters in vertical series, said check being ruled on its back by intersecting horizontal and vertical lines to provide spaces in horizontal and vertical rows, each space on the back of the check registering with a space on the front of the check, and said spaces in the vertical rows on the back of the check being provided with ordinal characters indicating the relative position in the horizontal and vertical rows of the corresponding space on the face of the check.

In testimony that I claim the foregoing as my invention I affix my signature in the presence of two witnesses, this 2nd day of June A. D., 1913.

GEORGE CARL FISHER.

Witnesses:
G. R. WILKINS,
T. H. ALFREDS.

Copies of this patent may be obtained for five cents each, by addressing the "Commissioner of Patents, Washington, D. C."